March 24, 1936. W. R. GRISWOLD 2,034,944
MOTOR VEHICLE
Filed Dec. 8, 1934
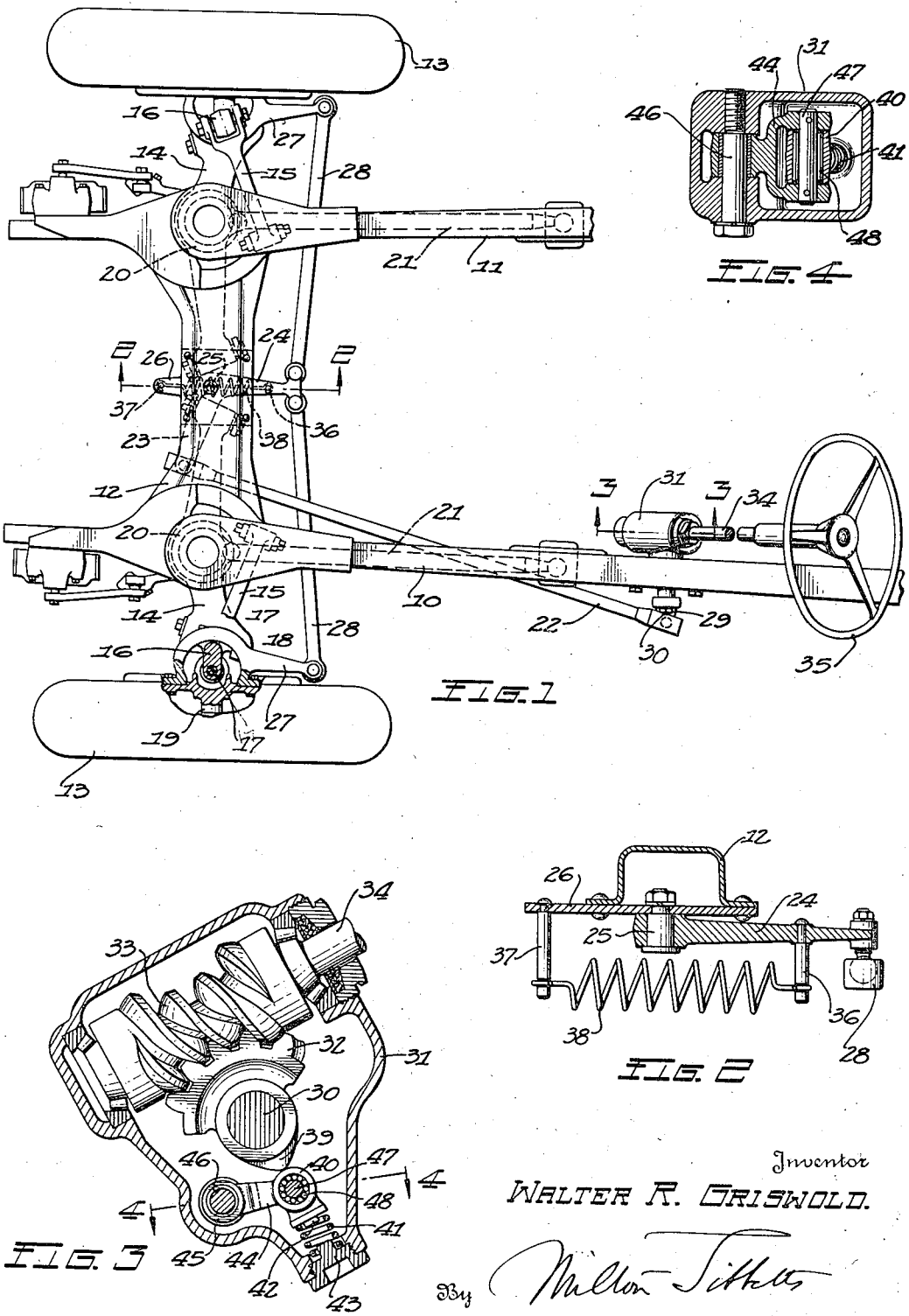
Inventor
WALTER R. GRISWOLD.
By Milton Tibbetts
Attorney Patented Mar. 24, 1936

2,034,944

UNITED STATES PATENT OFFICE 2,034,944

MOTOR VEHICLE

Walter R. Griswold, Detroit, Mich., assignor to Packard Motor Car Company, Detroit, Mich., a corporation of Michigan Application December 8, 1934, Serial No. 756,646

10 Claims. (Cl. 280—89)

This invention relates to motor vehicles and more particularly to steering road wheels.

Steering road wheels for motor vehicles are usually pivotally mounted so that they can be swiveled by steering mechanism operable by manually applied force. Substantially no effort on the part of the operator is required in returning the steering mechanism to neutral position after a steering operation, that is, to a position in which the vehicle will move in a straight course. This automatic return of steering mechanism to neutral position is well known and occurs mainly through forces developed by the steering wheels during application of manual force thereagainst due to their castor and camber, tire slippage and inclined position of the king pins.

With some types of wheel mountings this automatic return of the steering road wheels and steering mechanism to neutral position is so gradual that a manually applied restraining force is not required for safe driving. With other forms of steering road wheel mountings, the automatic return movement of the wheels and the steering mechanism to neutral position upon release of manual force therefrom is so fast that driving is unsafe unless the return is restrained by the driver, and this is particularly characteristic of some types of independently mounted steering wheels. Under the latter circumstance, the driver must therefore apply force to move the steering mechanism away from a neutral position and he must also apply force to retard the return of steering mechanism toward neutral position. This substantially constant application of manual force applied to the control wheel of the steering mechanism is extremely fatiguing to the driver.

An object of this invention is to decrease driving fatigue caused by steering motor vehicles through the provision of steering mechanism in which return movement toward neutral position is automatically restrained.

Another object of the invention is to provide steering mechanism with means which assists the manually applied force exerted to move the road wheels away from a straight line position and which also restrains the normal automatic return movement of the mechanism when the manually exerted force is released.

A further object of the invention is to provide steering mechanism for motor vehicle road wheels which can be easily and safely operated.

Other objects of the invention will appear from the following description taken in connection with the drawing, which forms a part of this specification, and in which:

Fig. 1 is a plan view of the forward end of a motor vehicle chassis having steering mechanism incorporating the invention associated therewith;

Fig. 2 is a sectional view of the steering mechanism taken on the line 2—2 of Fig. 1;

Fig. 3 is a sectional view of the worm and gear portion of steering mechanism taken on the line 3—3 of Fig. 1, but having in addition thereto a modified form of the invention;

Fig. 4 is a sectional view taken on the line 4—4 of Fig. 3.

Referring now to the drawing by characters of reference, 10 and 11 indicate the side sills of a motor vehicle main frame connected at their forward ends by a transversely extending frame member 12.

At the forward end of the frame is arranged a pair of independently mounted steerable road wheels 13. A pair of vertically spaced links 14 and 15 extend from each side of the frame and are pivotally mounted thereto at their inner ends. At the outer ends of each pair of links is a carrier member 16 to which a knuckle 17 is swiveled by means of a king pin 18. Carried by the knuckles are spindles 19 on which the wheels 13 are mounted to rotate. Coil springs 20 are mounted between each of the links 14 and the main frame extending thereabove. Radius rods 21 are swiveled at their rear ends to the frame and at their forward ends to the links 14.

The wheels 13 are free to move in a vertical direction with the arms 14 and 15 and they are also free to swivel laterally for steering on the king pins 17. Steering mechanism consists of an angularly extending drag link 22 which is pivotally connected at its forward end to an arm 23 extending laterally from an actuator link 24 pivoted at 25 to a plate 26 riveted to the bottom of the cross frame member 12. Fixed to the knuckles of the steering wheels are arms 27, and such arms are connected with the link 24 by tie rods 28. A link 29 is swiveled to the rear end of the drag link and is fixed to rock with shaft 30 extending through the side rail 10 into a gear housing 31. Fixed on this shaft 30 within the housing is a worm sector 32 meshing with a worm 33, the worm being fixed to shaft 34 on the end of which is mounted the steering hand wheel 35. Rotation of the hand wheel will rotate the shaft 34 and the worm fixed thereto so that such motion is imparted to the shaft 30 through means of the worm sector 32. This movement of the shaft 30 is transmitted to the link 29 which moves the drag link forwardly or rearwardly and rocks the link 24 therewith through means of its connection with the arm 23. Such movement of the link 24 is transmitted to the drag links 28 and the arms 27 so that the wheels carried by the knuckles to which the arms are secured will be swiveled for steering.

With this and other forms of steering mechanisms, manually applied force is exerted in rotating the hand wheel to move the steering mechanism and the steering wheels in a direction away from neutral position, that is, away from a position in which the vehicle will travel in a straight direction. When the manual force is released from the hand wheel during a steering operation, the steering mechanism and the steering wheels will be automatically moved toward neutral position at a speed which is dangerous from a standpoint of safety and a manually applied restraining force must therefore be exerted. In order to eliminate the requirement of manual restraining force, I propose to associate with the steering mechanism means for automatically retarding the movement thereof toward a neutral position so that the return will be so gradual that safe driving will result.

One form which such automatic mechanism for restraining the return of steering mechanism to neutral position can take is shown in Figs. 1 and 2 of the drawing. A pin 36 is fixed to and depends from the link 24 in a relation rearwardly of the pivot 25, and a somewhat similar pin 37 is fixed to depend from the plate 26 in advance of the pivot 25. When the steering mechanism is in neutral position, the pins 36 and 37 are in alignment with the pivot 25 longitudinally of the chassis. Anchored to and extending between the pins 36 and 37, below the lever 24, is a coil spring 38. This spring is of a character such that it will create a force sufficient to restrain the movement of link 24 toward the neutral position shown in Fig. 1 at a desired rate of speed upon release of manual force from the steering wheel 35. This spring is ineffective to influence movement of the link 24 when it is in neutral position because of the aligned relation of the anchored ends and the pivot 25. When manual force is applied to the steering wheel 25 to turn the steering mechanism so that the link 24 is moved to either side of the longitudinal line through the pins 36 and 37 and the pivot 25, then the spring 28 exerts a force upon the pin 36 and the lever 24 in a direction tending to assist the manual operation of the steering mechanism. It will thus be seen that the spring means 38, in this form of the invention, serves the dual function of assisting the manual steering operation and automatically restraining the return of the steering mechanism and the steering road wheels so that this latter movement is gradual.

In another form of the invention, as shown in Figs. 3 and 4, the pins 36 and 37 and the springs 38, shown in Figs. 1 and 2, are not utilized. Instead, mechanism functioning in a similar manner is associated with the gearing in the steering mechanism. The gear sector hub in this instance is formed to provide a cam 39, and cooperating therewith is a bearing member 40 which is held thereagainst under pressure of coil spring 41. The bearing member has a pilot end 42 with which one end of the spring is associated, and a plug 43 screws into the gear casing 31 and is formed with a pilot end with which the other end of the spring is associated.

The bearing member 40 is maintained in relation with the cam 39 by means of a double arm lever structure 44 having a hub 45 mounted on a shaft 46 carried within the gear casing. A shaft 47 is carried by the free ends of the double arms 44, and the bearing member 40 is carried by the shaft 47, there being suitable rollers 48 interposed between such shaft and the bearing. The cam is arranged so that its faces on each side of the nose portion are similar and the nose is so arranged with respect to the gear sector that the bearing will engage therewith when the steering mechanism is in neutral position. Under such circumstance the spring pressure against the bearing member will have no influence to rock the gear sector. When the gear sector is turned in either direction, through the application of manual force on the steering wheel 25 to turn the wheels 13, then the nose of the cam 39 moves past the bearing member, and the bearing member will bear against a side of the cam. The spring 42 will exert a force against the bearing member which is transmitted to the cam, thereby assisting the manually applied force exerted to move the steering mechanism and wheels away from a neutral position. When the manual force is released from the steering wheel 25 the steering road wheels and the steering mechanism are moved toward neutral position by forces developed, due to camber and castor, tire slippage, and king pin angle, caused by the steering movement. The spring pressure on the bearing member 40 will exert a force against the cam automatically restraining its return to neutral position. The extent of this restraint can be controlled by the characteristics of the spring 41 so that the automatic return of the steering gear and the steering wheels toward neutral position can be regulated as desired.

Through the application of the force applying means, herein described, for restraining return movement of the steering mechanism and the steering wheels, and for assisting the manual effort in moving the steering wheels and the steering mechanism away from neutral position, motor vehicles can be easily and safely controlled irrespective of the type of wheel mounting.

Although the invention has been described in connection with specific embodiments, the principles involved are susceptible of numerous other applications which will readily occur to persons skilled in the art. The invention is therefore to be limited only as indicated by the scope of the appended claims.

What I claim is:

1. In a motor driven vehicle, the combination with mechanism manually operable to steer the vehicle, of means associated with said mechanism in a relation assisting manual actuation thereof away from neutral position in either direction of movement.

2. In a motor driven vehicle, the combination with mechanism manually operable to turn road wheels in directions away from neutral position and returnable automatically when the application of manual force thereto is released, of means effective to assist manual operation and to retard automatic return movement of said mechanism.

3. In a motor driven vehicle, the combination with steering mechanism manually operable for steering movement and automatically returnable to neutral position from any steering position, of means associated to exert a force against said mechanism retarding its automatic movement toward neutral position and accelerating its manual movement to any steering position away from neutral.

4. In a motor driven vehicle, the combination with mechanism manually operable to turn road wheels in a direction away from neutral position and returnable to a neutral position automatically whenever the application of manual steering pressure thereto is released, of spring pressure operated means associated to assist manual operation and to retard automatic return movements of said steering mechanism.

5. In a motor vehicle, the combination with steering mechanism having gearing forming a part thereof, of spring pressed means engaging said gearing to retard its movement toward neutral position.

6. In a motor vehicle, the combination with steering mechanism having a gear sector with a cam on its hub, of means cooperating with said hub cam to retard its movement toward neutral position comprising a pivoted bearing means engaging said cam and a spring pressing said bearing member against said cam.

7. In a motor vehicle, the combination with steering mechanism having an actuator lever, of spring means connected with a stationary part of the vehicle and the lever in a relation opposing movement of said lever toward neutral position.

8. In a motor vehicle, the combination of a chassis, a steering mechanism actuating lever pivoted to said chassis, and spring means connecting the free end of said lever with said chassis, said spring means assisting the operation of said lever to move the steering mechanism away from neutral position and retarding the operation of said lever to move said steering mechanism toward neutral position.

9. In a motor driven vehicle, the combination with steering mechanism adapted to be controlled manually for steering movement and to be returned automatically to neutral position upon release of the manual control, of spring pressure means associated to slow down the automatic return movement of said steering mechanism from any position of release, said pressure means exerting an opposing force of less magnitude than that exerted to automatically return said steering mechanism to neutral position.

10. In a motor driven vehicle, the combination with steering mechanism having gearing therein, said mechanism being adapted to be controlled manually for steering movement and to be returned automatically to neutral position upon release of the manual control, of a cam fixed to one of the gears in said mechanism and spring pressed means engaging said cam to exert a pressure thereagainst of a force having less magnitude than that exerted to automatically return said steering mechanism to neutral position.

WALTER R. GRISWOLD.